United States Patent
Richter et al.

[11] Patent Number: 5,806,881
[45] Date of Patent: Sep. 15, 1998

[54] GAS BAG FOR A VEHICLE OCCUPANT RESTRAINT SYSTEM

[75] Inventors: Thomas Richter, Schwäbisch Gmünd; Dominique Acker, Alfdorf, both of Germany

[73] Assignee: TRW Occupant Restraint Systems GmbH, Alfdorf, Germany

[21] Appl. No.: 743,892

[22] Filed: Nov. 6, 1996

[30] Foreign Application Priority Data

Nov. 13, 1995 [DE] Germany .................. 295 17 951.1

[51] Int. Cl.⁶ .................................. B60R 21/22
[52] U.S. Cl. ......................... 280/730.2; 280/743.1
[58] Field of Search ............... 280/743.1, 743.2, 280/730.1, 730.2, 728.1, 729, 732

[56] References Cited

U.S. PATENT DOCUMENTS

| | | | |
|---|---|---|---|
| 5,308,113 | 5/1994 | Moriset | 280/743.2 |
| 5,312,132 | 5/1994 | Pillet | 280/743.1 |
| 5,454,595 | 10/1995 | Olson et al. | 280/743.1 |
| 5,562,302 | 10/1996 | Turnbull | 280/743.1 |
| 5,570,900 | 11/1996 | Brown | 280/743.1 |
| 5,647,609 | 7/1997 | Spencer et al. | 280/730.1 |

FOREIGN PATENT DOCUMENTS

| | | | |
|---|---|---|---|
| 4405927 | 2/1995 | Germany . | |
| 3-67748 | 3/1991 | Japan | 280/743.1 |
| 5238347 | 9/1993 | Japan . | |
| 2283463 | 5/1995 | United Kingdom . | |

*Primary Examiner*—Peter C. English
*Attorney, Agent, or Firm*—Tarolli, Sundheim, Covell, Tummino & Szabo

[57] ABSTRACT

A gas bag for a vehicle occupant restraint system comprises a flexible wall which defines several sides of the gas bag. The flexible wall has on at least one of its sides at least one fold in the inflated state of the gas bag, the fold being defined by permanently connected adjacent sections of the wall. The wall further comprises at least one seam for the connection of the adjacent sections so that the flexible wall is shortened on the side and, therefore, the geometrical shape of the gas bag is modified compared with the gas bag of similar configuration but without the seam.

6 Claims, 2 Drawing Sheets

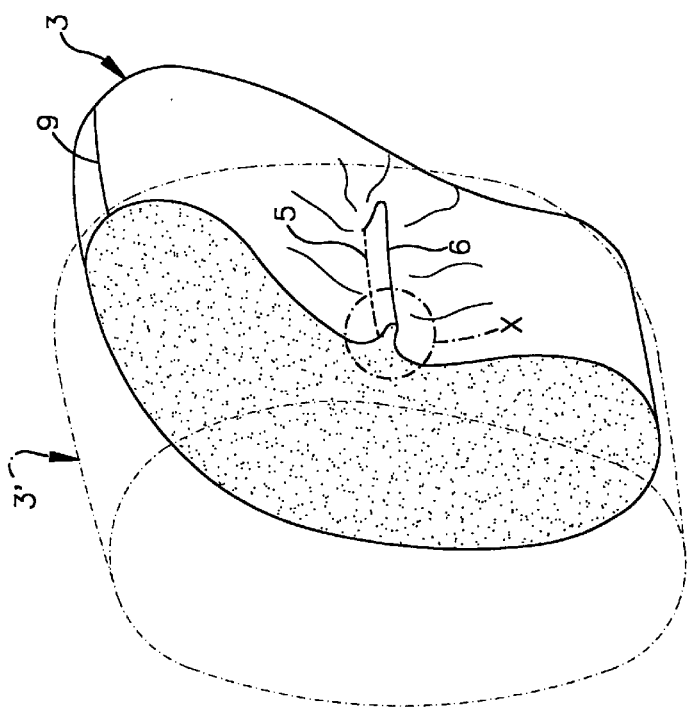
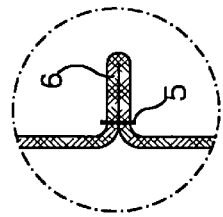
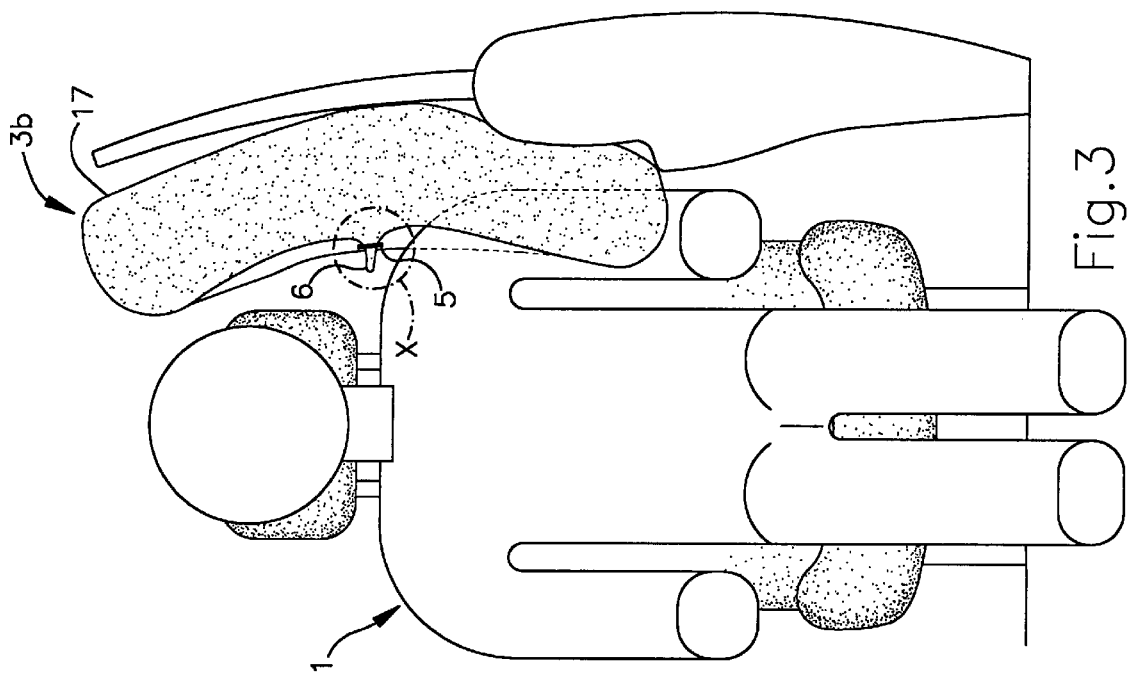

GAS BAG FOR A VEHICLE OCCUPANT RESTRAINT SYSTEM

TECHNICAL FIELD

The present invention relates to a gas bag for a vehicle occupant restraint system.

BACKGROUND OF THE INVENTION

In gas bags known hitherto, which have an asymmetrical shape in order to match the position of a vehicle occupant in the best possible way, this asymmetrical shape is usually produced by joining together two asymmetrical lateral parts by means of a cover part. Such a gas bag design has the disadvantage that only curves in the gas bag up to certain upper limits can be achieved, since otherwise, for example in the case of a curved gas bag, the cover surface would bulge out on a concave side to be created and reduce the curvature on the concave side.

If, because of a special gas bag position in the vehicle, a gas bag has to have a shape with highly curved surfaces, then it is also possible to make up the gas bag from a large number of individual gas bag sections which have been duly cut to size. This, however, is very expensive.

SUMMARY OF THE INVENTION

An object of the invention is to provide a gas bag with an asymmetrical shape which can be produced in a simple manner, thus providing more possibilities for positioning the gas bag in the vehicle.

In accordance with the invention, the gas bag comprises a flexible wall defining several sides of the gas bag. The wall has on at least one of its sides at least one fold in the inflated state of the gas bag. The fold is defined by permanently connected adjacent sections of the wall and at least one seam for the connection of the adjacent sections so that the flexible wall is shortened on the corresponding side. The gas bag has a geometrical shape which is modified compared with a gas bag of similar configuration but without the seam.

According to a preferred embodiment, the seam extends in a direction in which the fold extends.

The gas bag according to the invention is very easy to produce in that additional fabric layers or specially cut parts are not required. As a result of the seam, fabric parts of the gas bag are simply sewn together, with the result that the gas bag is correspondingly shortened in this area, leading to a modification of the curvature of the surface of the gas bag in at least this area. Therefore, by providing one or more seams, a gas bag can be given almost any desired shape, so that it can be adapted to the available space in the vehicle. It is therefore possible, in spite of the same basic shape of the gas bag, i.e. where the individual gas bag sections are cut in the same way, to produce various gas bag shapes by arranging seams in different ways, which simplifies gas bag manufacture, because fewer different parts are required. The gas bag according to the invention may also be located in positions further away in the vehicle, because it can adopt highly curved shapes, thereby increasing the possible ways of arranging a gas bag in the vehicle. A good reproducibility in gas bag shape for different gas bag positions in the vehicle has been achieved in tests.

In contrast to already known tear seams which control the direction of expansion of a gas bag during inflation, the seam of the gas bag according to the invention is also present when the gas bag is fully inflated and permanently connects sections of the gas bag together, irrespective of gas bag temperature or internal pressure.

In addition, it is, of course, also conceivable for additional tear seams to be provided for the gas bag according to the invention, which control the direction of expansion of the gas bag during inflation.

Furthermore, no special types of fabric are required for the gas bag material either, because the seam can be used with all types of fabric.

According to a preferred embodiment, the seam is formed as a quilted stitch seam and/or chain stitch seam. The type of seam itself and the numbers of seams can be varied, depending on the application, as can the length, the position or the geometrical shape of the seam.

According to a preferred embodiment, the gas bag according to the invention consists of at least two separate gas bag parts, joined along outer edges thereof.

Where the gas bag according to the invention is used as a side-impact protection device, then, according to a preferred embodiment, the fold is arranged on an inner side of the gas bag facing the interior of the vehicle in such a way that the gas bag has a concave shape on the inner side and a convex outer side. The gas bag thus arcuately extends around the head and chest areas of a vehicle occupant, so that the distance between the head of a vehicle occupant and the inflated gas bag is reduced, thus achieving lower acceleration values. In addition, the gas bag can be adapted to the shape of the side of the vehicle, which is now usually curved, so that in spite of this vehicle shape gas bags of relatively large volume can be used, because the gas bag will not try to escape from the inner side of the vehicle in the event of a collision.

BRIEF DESCRIPTION OF THE DRAWING

Further features and advantages of the invention are apparent from the description below and from the following drawings to which reference is made. In the drawings.

FIG. 1b shows a front view of the gas bag according to FIG. 1a;

FIG. 2b shows a front view of the gas bag according to FIG. 2a;

FIG. 3 shows a further embodiment of the gas bag according to the invention in the form of a side impact protection device in the area of the front seats;

FIG. 4 shows a perspective sectional view of a further embodiment of a gas bag according to the invention, as well as a corresponding gas bag without seam, indicated by dot-dash lines; and FIG. 5 shows an enlarged view of the details marked with an X in FIGS. 3 and 4, which represents a lateral view of a seam.

DETAILED DESCRIPTION OF THE INVENTION

Figure 1A:
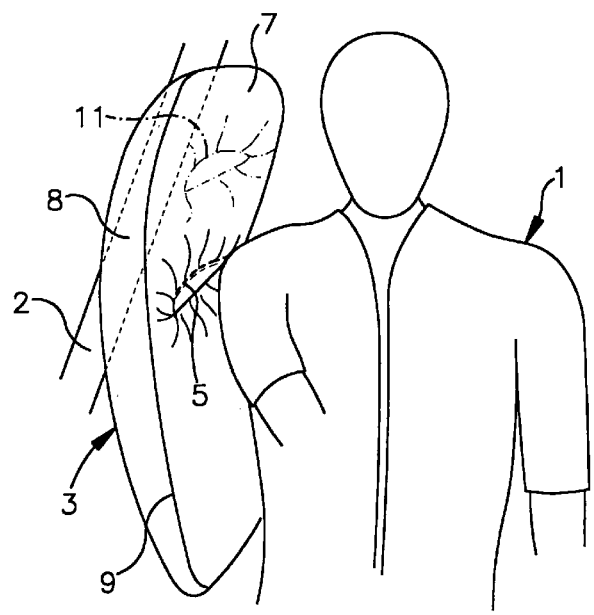
FIG. 1a shows a perspective view of a gas bag according to the invention, in its inflated state and which is designed as a side impact protection device.
Figure 1B:
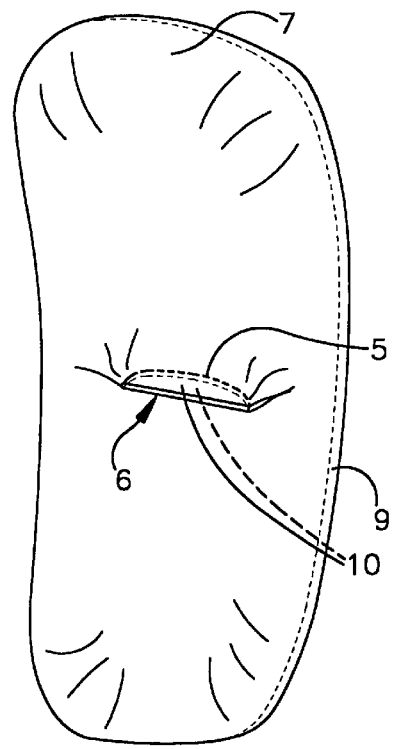

FIG. 1a shows a vehicle occupant 1 who is protected by a gas bag 3 acting as a side impact protection device in the event of a collision. The inflated gas bag depicted in FIGS. 1a and 1b shows this at t=30 ms after a collision. Reference numeral 2 designates the vehicle B pillar indicated. The gas bag 3 has a flexible wall which comprises two fabric parts, namely one fabric part 7 facing the inner side of the vehicle, which forms the inner side of the gas bag 3, and one fabric part 8 facing the outer side of the vehicle, which forms the outer side of the gas bag 3. Both parts 7, 8 are sewn together along their outer circumferential edges 9. A seam 5 extends almost horizontally over half of the breadth of the part 7, the seam being formed as a quilted stitch seam and connecting adjacent sections 10 of the gas bag 3 so that a fold 6 is formed and the inside wall defined by part 7 is shortened. Therefore, a concave inner side and a convex outer side are formed. The gas bag 3 shown in FIGS. 1a and 1b thus arcuately extends around the head and chest area of the vehicle occupant 1.

The seam 5 is formed in such a way that it does not tear even when the gas bag 3 is fully inflated, and it permanently joins together corresponding adjacent sections 10 of the gas bag 3. According to FIGS. 1a and 1b, the seam 5 is positioned in the shoulder area of the vehicle occupant 1, so that the curved shape produced in the head area tapers towards the middle of the vehicle and the distance between the head of the vehicle occupant 1 and the upper section of the gas bag 3 is maintained as small as possible.

Figure 2A:
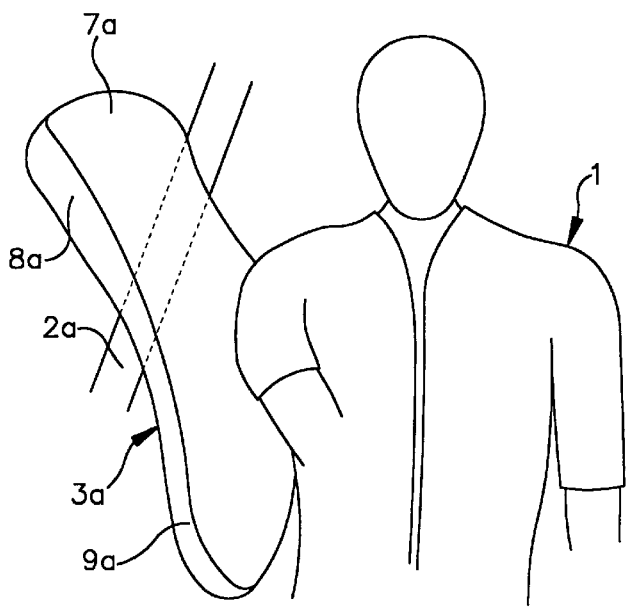
FIG. 2a shows a perspective view of a prior art gas bag without a seam, in its inflated state.
Figure 2B:
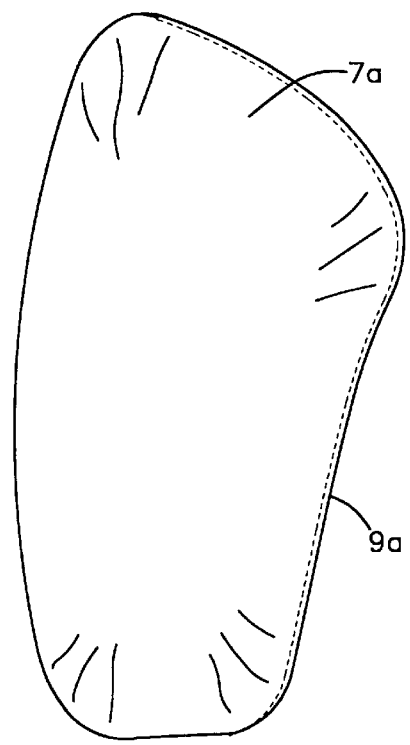

Whilst the gas bag with seam 5, shown in FIGS. 1a and 1b has such a curve, so that in an inflated state it is completely within the inner side of the vehicle, the gas bag 3a shown in FIGS. 2a and 2b and consisting of corresponding fabric parts 7a, 8a extends out of the vehicle at the same time of t=30 ms after a collision, since, without the seam 5, it has no corresponding geometrical shape. The gas bag 3a shown in FIGS. 2a and 2b is therefore neither adapted to its position in the vehicle nor to the vehicle occupant 1, with the result that the distances between parts of the body and the gas bag 3a are large, leading to a high impact speed and high acceleration values for these parts of the body. Reference numerals 2a and 9a designate a B pillar and outer gas bag edges, respectively.

The embodiment of the gas bag 3 shown in FIGS. 1a and 1b can be further modified by providing additional seams and one or more additional folds, e.g. vertical seams, due to which the vehicle occupant 1 could be laterally enclosed by the gas bag in the event of a collision, or an additional seam 11 as indicated in FIG. 1a in the part 7 at head level, whereby a top half of the gas bag 3 would be curved even more towards the head of the vehicle occupant 1. In this way, the gas bag may have a wide variety of different curves on its surface.

The embodiment of the gas bag 3b depicted in FIG. 3 defining a side-impact protection device shows a gas bag 3b, consisting of two lateral parts affixed to each other by a envelope part 17. A seam 5 extends horizontally at the inner side of the gas bag 3b, the seam giving the gas bag 3b a curved shape. Even in the case of the embodiment shown in FIG. 3, the seam 5 extends horizontally at the inner side of the gas bag 3b, at shoulder level of the vehicle occupant 1. A fold 6 extending in the direction of the horizontal run of the seam 5 consists of connected sections of the gas bag 3b. The fold 6 is soft and, therefore, in no way increases the risk of injury.

The gas bag 3 shown in FIG. 4 consists of two fabric parts which are connected to each other by a peripheral seam at their peripheral edges 9. A gas bag 3' without seam 5, corresponding to the gas bag 3 with seam 5 marked by continuous lines, is shown by way of dot-dash lines. The seam 5 extends at the inner side of the gas bag 3 and transversely to the inner side, but not over the entire breadth of the gas bag 3, but only over part of the breadth in the middle of the gas bag 3, thus resulting in a concave curve on the inner side of the gas bag 3 in both a horizontal and vertical direction. With the gas bag 3 in its inflated state, the seam 5 is located roughly at shoulder level of the vehicle occupant, so that by the indentation in the gas bag 3 created by the seam 5, in which the shoulder of the vehicle occupant comes to rest in the event of a collision, the vehicle occupant is then enclosed and protected from the side, the front and the back and the gas bag 3 performs a restraining and cushioning function in several directions.

It can be clearly seen in FIG. 5 that the seam 5 connects two portions of the gas bag 3, so that the portions which are then adjacent to each other create the extension fold 6.

The position of the seam 5 enables a gas bag to adopt any shape, so that it can be positioned at remote points in the passenger compartment and can, moreover, be more easily adapted to the vehicle interior and the space occupied by the vehicle occupant. The gas bag 3 is not only limited to use as a side-impact protection device, but can also, for example, act as a frontal impact, chest, knee or pelvis protection device for vehicle front and rear occupants, when designed accordingly. Therefore, for example, the gas bag shown in FIG. 4 can also be used as a frontal impact protection device.

We claim:

1. A gas bag for a vehicle occupant restraint system comprising:

a flexible wall separating the inside of said gas bag from the outside of said gas bag, said flexible wall defining several sides of said gas bag and having on at least one of said sides at least one fold in the fully inflated state of said gas bag, said fold protruding from the outside of said gas bag and being defined by permanently connected adjacent sections of said wall, and at least one seam for connection of said adjacent sections and for defining said fold, by means of said seam said flexible wall is shortened on said side and is concave shaped.

2. The gas bag according to claim 1, wherein said seam extends in a direction in which said fold extends.

3. The gas bag according to claim 1, wherein said seam is at least one of a quilted stitch seam and chain stitch seam.

4. The gas bag according to claim 1, consisting of at least two separate gas bag parts joined along outer edges thereof, said fold being provided in one of said gas bag parts.

5. The gas bag according to claim 1 for use as a side impact protection device, wherein said gas bag has an inner side facing the occupant in the inflated state and an outer side facing away from the occupant, said fold being arranged on said inner side in such a way that said gas bag has a concave shape on said inner side and a convex shape on said outer side, to extend around head and chest areas of the vehicle occupant.

6. The gas bag according to claim 5, wherein said seam is located roughly at shoulder level of the vehicle occupant and extends over a part of the entire breadth of said gas bag in the middle of said inner side of said gas bag, said inner side having a concave curve in both horizontal and vertical directions.

* * * * *